Sept. 23, 1930.        J. SCHIBLER        1,776,706
ELECTRICALLY ENERGIZED SPRING MOTOR
Filed Sept. 26, 1928        2 Sheets-Sheet 1
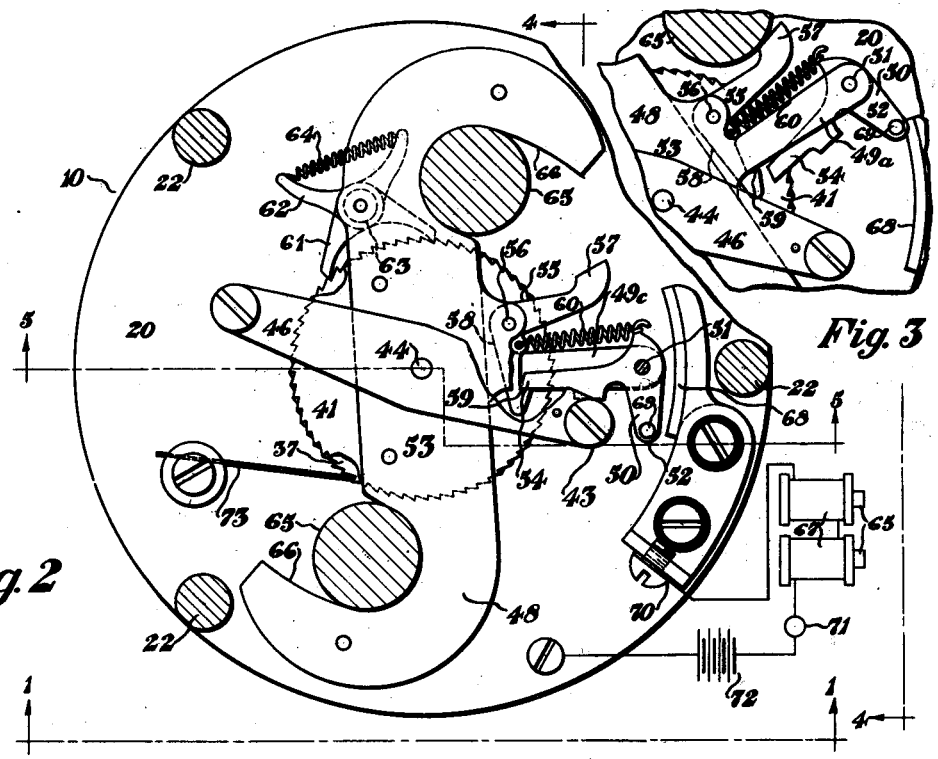
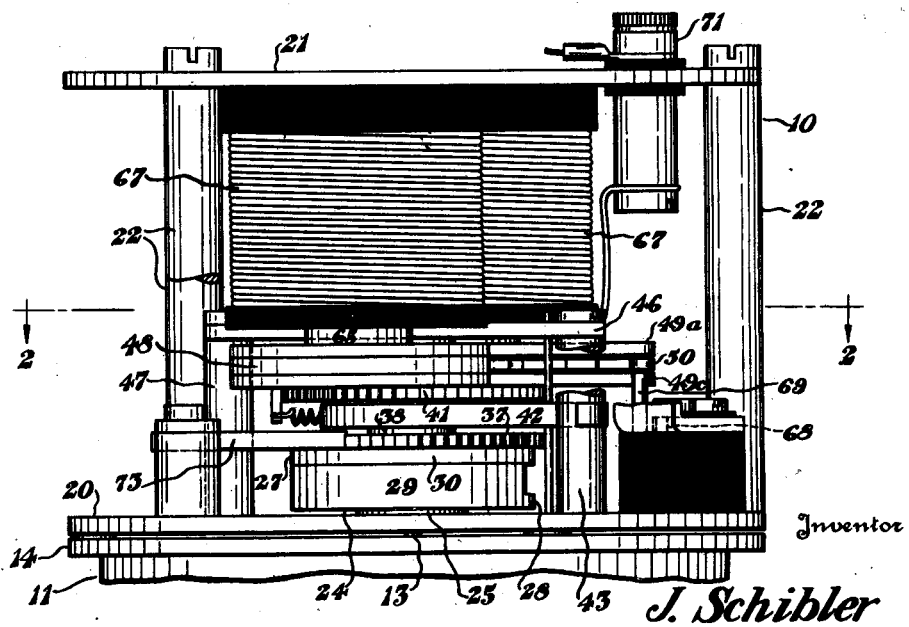

Sept. 23, 1930. J. SCHIBLER 1,776,706
ELECTRICALLY ENERGIZED SPRING MOTOR
Filed Sept. 26, 1928 2 Sheets-Sheet 2
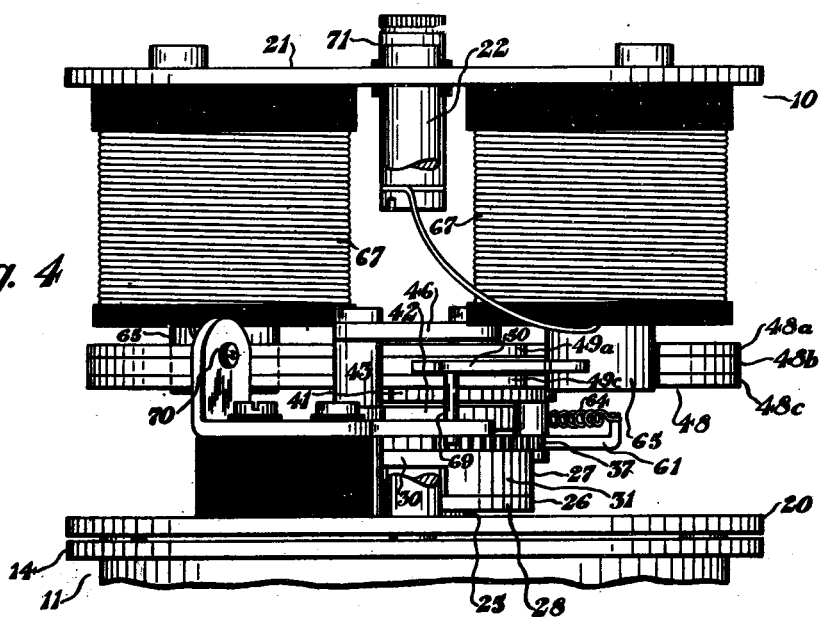

Patented Sept. 23, 1930

1,776,706

UNITED STATES PATENT OFFICE

JOSEPH SCHIBLER, OF CANTON, OHIO, ASSIGNOR TO WILLIAM W. BILLINGS, OF ROCKY RIVER, OHIO

ELECTRICALLY-ENERGIZED SPRING MOTOR

Application filed September 26, 1928. Serial No. 308,498.

My invention relates to spring motors particularly adapted for use as drive units for electric watches and clocks, as well as for use in suitable sizes as motor driving units for any other desired mechanisms or machines.

The objects of the present invention include the simplification and improvement of the construction and arrangement of electrically energized spring motors, whereby the spring motors of the present invention are easier and more economical to manufacture, are more reliable and certain in their operation, and are subject to less maintenance than has been the case with electrically energized spring motors for similar services which have heretofore been used.

Most electrically energized spring motors include an electro-magnet, a spring, a drive shaft, a battery or the like, and an automatic switch, the spring being intermittently energized by the electro-magnet for turning the drive shaft for a predetermined time, and the switch being cooperatively connected with the drive shaft and the magnet to make and break an electric circuit through the magnet and the battery at the proper times for intermittently energizing the spring.

Particularly for use in driving watch or clock movements, means should be provided for maintaining a constant torque on the drive shaft, at all times, and particularly during the energizing of the spring.

More particularly, the objects of the present improvements include the provision of a simplified and more efficient mechanism between the electro-magnet and the spring for intermittently energizing the spring, a simplified and more efficient switch mechanism, and simplified and more efficient means for maintainig constant drive shaft torque during the energizing of the spring, together with a simplified and more efficient arrangement of the other detail parts of the spring motor.

These and ancillary objects are attained in the improved electrically energized spring motor comprising the present invention, a preferred embodiment of which is hereinafter set forth in detail and is illustrated in the accompanying drawings forming part hereof, in which Figure 1 is a fragmentary side view of the improved electrically energized spring motor, illustrated as being used for driving an electric watch, as in the direction of the arrows 1—1, Fig. 2;

Fig. 2, a fragmentary plan sectional view thereof as on line 2—2, Fig. 1, the various elements of the improved switch mechanism being illustrated in their positions just after the circuit has been opened, and certain of the electrical parts of the motor being illustrated diagrammatically;

Fig. 3, a fragmentary view similar to Fig. 2, illustrating the positions of the various switch elements just after the circuit has been closed;

Fig. 4, a side view of the motor as in the direction of the arrows 4—4, Fig. 2, after the main spring has been partially deenergized;

Fig. 5, a sectional view of the motor as on line 5—5, Fig. 2; and

Fig. 6, a fragmentary sectional view thereof as on line 6—6, Fig. 5.

Similar numerals refer to similar parts throughout the drawings.

The improved electrically energized spring motor indicated generally at 10 in the preferred embodiment, is illustrated as driving a watch or clock movement of any desired construction and indicated at 11, the watch movement including a drive spindle 13 extending outwardly through the back plate 14 thereof, and separably connected with the drive shaft 15 of the motor as by providing a flat surface 16 at one side of the outer end of the spindle 13 and inserting the irregularly shaped outer spindle end thus formed in a like shaped aperture 17 in a preferably steel disk 18 engaged by a force fit in a suitable counterbore 19 at the end of the shaft 15.

The improved electrically energized spring motor 10, includes a front plate 20 and a back plate 21 spaced apart and secured in a usual manner by pillars 22, for forming a suitable mounting for the mechanisms of the motor.

The outer end of the shaft 15 is arranged to rotate in a suitable aperture 23 in the motor front plate 20, and the shaft 15 has secured thereon an improved half barrel 24, there being a suitable washer 25 interposed between the opposite faces of the front plate 20 and the barrel end.

The half barrel 24 opens towards the back plate, and the shaft 15 has secured thereon within the opening of the half barrel 24 a collar 26 which forms a thrust seat for a half barrel 27 rotatably mounted on the main body of the shaft 15, the half barrel 27 opening towards the main plate 20.

The half barrel 24 comprises a disk 28 and a sectoral cylindric wall 29 extending as aforesaid towards the back plate, and the half barrel 27 comprises a disk 30 and a sectoral cylindric wall 31 extending towards the front plate. Opposite ends 32 and 33 of the sectoral walls 29 and 31, respectively, are arranged to abut against each other to limit the angular movement of the half barrels with respect to each other, as is best illustrated in Fig. 6. The half barrels 24 and 27 and the cylindric walls 29 and 31 thereof form arm members, the first secured to the shaft 15 and the second rotatably mounted thereon.

Energy storing means which may be a sectoral spring 34 has one end engaged as at 35 with the other end of the sectoral wall 29, and the other spring end is engaged as at 36 with the other end of the sectoral wall 31, normally tending to move the disks so that the ends 32 and 33 will tend to abut each other, for purposes hereinafter to be set forth.

A ratchet wheel 37 is secured to the half barrel 27, and a main drive sleeve 38 is rotatably mounted on the body 39 of the shaft 15 at the back plate side of the ratchet wheel 37.

At the front plate end of the sleeve 38 an outwardly extending flange 40 is formed for spacing the ratchet wheel 37 from an adjusting ratchet wheel 41 secured on the sleeve 38.

Energy storing means which may be a spiral main spring 42 has one end secured to the collar 40 and the other end secured to a post 43 extending from the front plate towards the back plate for this and other purposes.

The outer end 44 of the shaft 15 is reduced in diameter and a washer 45 may be placed thereon for being interposed between the end of the main body 39 of the shaft and the end of the sleeve 38, and a bridge 46, one end of which is removably secured at the outer end of the post 43 and the other end of which is removably secured at the outer end of a post 47, extending from the front plate 20, a suitable aperture being provided in the bridge 46 for forming a bearing at the outer end 44 of the shaft 15.

An improved laminated rotating armature 48 is rotatably mounted on the sleeve 38 between the adjusting ratchet wheel 41 and the washer 45; and the laminated armature 48 preferably includes three laminæ 48ª, 48ᵇ, and 48ᶜ, the laminæ having an S-profile, as best illustrated in Fig. 2.

The outer laminæ 48ª and 48ᶜ are provided with preferably radially extending automatic contact mounting arms 49ª and 49ᶜ, between the outer ends of which a contact bell crank 50 is pivotally mounted as at 51, the bell crank including a contact arm 52 normally extending substantially parallel with the main body 53 of the armature, and a trip and actuating arm 54 extending towards the shaft 15.

A catch bell crank 55 is pivotally mounted between the laminæ 48ª and 48ᶜ as at 56, and includes an actuating arm 57 extending laterally outwardly from the body 53 of the armature, and a catch arm 58 extending alongside of the body 53 of the armature and provided at its outer end with a catch 59 arranged to engage and disengage the outer end of the trip arm 54 of the contact bell crank 50.

A tension spring 60 is connected at one end with one bell crank and the other end with the other bell crank to normally tend to rotate the same counter-clockwise as viewed in Fig. 2.

As viewed in Fig. 2, the ratchet wheel 37 has teeth arranged for opposing clockwise rotation when impinged by a suitable pawl, and the adjusting ratchet wheel 41 has teeth arranged for opposing counter-clockwise rotation when impinged by a suitable pawl, and at one side of the shaft 15, a pawl 61 is pivotally mounted on the armature 48 for thus opposing rotation of the ratchet wheel 37, and an oppositely operating pawl 62 is pivotally mounted preferably on the same mounting as at 63 as is provided for the pawl 61; and the pawl 62 opposes rotation of the adjusting ratchet 41, the pawls being connected by the ends of a tension spring 64 for normally urging each pawl towards its respective ratchet wheel.

The back plate 21 has mounted thereon a pair of magnet cores 65 which extend from the back plate toward the front plate into the concave end 66 of the S-shaped armature 48.

Each core 65 has a coil 67 mounted thereon and connected with each other in series, the electro-magnets thus formed being suitably insulated from the motor frame.

An arcuate contact shoe 68 is mounted on and insulated from the front plate 20, for engagement and disengagement with a contact tongue 69 extending from the contact arm 52 of the contact bell crank 50.

One free terminal of the electro-magnet coils is connected as at 70 with the contact shoe 68, and the other free terminal of the electro-magnet coils is connected through the insulated binding post 71, with one terminal of a battery 72, the other terminal of which is connected with the frame of the motor to which the contact tongue 69 is grounded.

A spring pawl 73 is secured to the plate 20, and its outer end extends into engagement with the teeth of the ratchet wheel 37 for preventing clockwise rotation thereof, as viewed in Fig. 2.

The operation of the improved electrically energized motor is as follows:

The drive shaft 15 of the motor being separably connected as aforesaid with the drive spindle 13 of the watch movement, a resisting torque is applied to the drive shaft 15, and the usual escapement of the watch movement permits rotation of the drive shaft 15 if a suitable driving torque is applied thereto.

This driving torque is applied in the present improved electrically energized spring motor primarily by means of the spiral main spring 42, and at certain times by the sectoral secondary spring 34, although it is obvious that other types of spring may be used by suitably modifying the spring connections, whereby the effective operation of the present motor may still be attained.

As illustrated in Figs. 1 and 2 the various parts of the improved spring motor are in their several positions, just after the electromagnet has been energized and the armature 48 rotated clockwise to the position illustrated in Fig. 2 by the attraction of the pole 65, of the energized electro-magnet.

During the rotation of the armature 48, the pawl 61 ratchets over the ratchet wheel 37, this wheel being prevented from clockwise rotation as viewed in Fig. 2, by the spring pawl 73, whereby the secondary spring 34 reacting at 36 against the half barrel 27 secured to the wheel 37, continues rotation of the drive shaft counter-clockwise as viewed in Fig. 6, by the pressure of the other end of the spring at 35 against the half barrel 24 which is secured to the drive shaft.

It is to be understood that counter-clockwise rotations of the various elements, as viewed in Figs. 2, 3, and 6, when viewed from the opposite side of the front plate 20, are clockwise rotations; the face, not shown, of the watch movement 11, being on the aforesaid opposite side of the front plate 20.

In other words, when the ratchet wheel 37 and half barrel 27 are maintained stationary by the spring pawl 73 during the rotation of the armature 48 when the electromagnet is energized, the secondary spring 34 rotates the drive shaft 15 in the proper direction.

The relative rotary movement of the half barrels 27 and 24 with repect to each other during the aforesaid clockwise rotation of the armature 48 is of very small magnitude, due to the rapidity of the action of the various mechanisms.

It is however essential for the proper operation of the watch movement that the drive shaft always have a driving torque applied thereto, and without the secondary spring 34 functioning as aforesaid, during the aforesaid main spring energizing rotation of the armature 48 and the ratcheting of the pawl 61 over the teeth of the ratchet wheel 37, no driving torque whatever would be applied to the drive shaft 15.

After the armature 48 has been rotated counter-clockwise as aforesaid, and has assumed the position illustrated in Fig. 2, the outer end of the spiral main spring 42 being secured as aforesaid to the post 43 and the inner end being secured to the collar 40 of the sleeve 38, which sleeve is secured to the adjusting ratchet wheel 41, and the counter-clockwise operating pawl 62 providing a driving connection between the armature 48 and the adjusting ratchet wheel 41, the spiral main spring 42 will be energized.

It is to be understood that the adjusting ratchet wheel 41 is provided for adjusting the initial tension on the spiral main spring 42, by partial clockwise rotation of the adjusting ratchet wheel 41, when the armature 48 is stationary.

After the proper initial tension has been given to the spiral main spring 42, as aforesaid, in the operation of the motor, the armature 48 is in effect connected with the sleeve 38.

The spiral main spring 42 being thus energized, it will urge the armature 48 to rotate counter-clockwise as viewed in Fig. 2; thereby, through the pawl 61, rotating the drive ratchet wheel 37 counter-clockwise and impinging the end 36 of the half barrel 27 against the end 35 of the half barrel 24, thereby reenergizing the spring 34 and driving the half barrel 24 in counter-clockwise direction, as desired.

As the armature 48 rotates counter-clockwise as aforesaid, the spiral main spring 42 will be deenergized, and in order to operate the motor, it is necessary to intermittently re-energize the spiral main spring by successive clockwise rotations of the armature 48.

For this purpose, the movable contact tongue 69 carried on the armature 48, and cooperating with the stationary arcuate contact shoe 68, is arranged to automatically close a circuit through the battery 72 and the coil winding 67 when the armature has reached the position illustrated in Fig. 3, and to automatically open this circuit when the armature has been rotated in the reverse direction to the position illustrated in Fig. 2.

In the position illustrated in Fig. 2, the trip and actuating arm 54 of the contact bell crank 50 has been moved against the post 43, thereby rotating the contact arm 52 away from the arcuate contact shoe 68 and breaking the electrical connection between the contact shoe 69 and the arcuate contact shoe 68.

The spring 60 causes the catch 59 on the catch arm 58 of the catch bell crank 55 to engage the outer end of the trip arm 54 maintaining the contact bell crank 50 in the position illustrated in Fig. 2 during the major portion of the main spring deenergizing rotation of the armature 48.

Very shortly before the end of such main spring deenergizing rotation of the armature 48, the actuating arm 57 of the catch bell crank 55 is impinged by the moving armature against one of the electro-magnet cores 65, thereby rotating the catch bell crank 55 clockwise and disengaging the outer end of the trip arm 54 of the contact bell crank 50 from the catch 59, whereby the spring 60 will rapidly snap rotate the contact bell crank 50 in the counter-clockwise direction and impinge the moving contact tongue 69 against the stationary arcuate contact shoe 68, thereby closing the circuit through the magnet coils 67 and the battery 72, and energizing the electro-magnet so that the armature 48 will be rotated clockwise to resume the position illustrated in Fig. 2, after which the above described cycle of operations will be successively repeated.

It is to be particularly noted that the moving contact tongue 69 makes wiping contact with the stationary arcuate contact shoe 68, and is very rapidly connected and disconnected therewith by the snap action of the spring 60.

Such wiping contact and rapidity of connection and disconnection is very important to minimize sparking and to insure the successful operation of the motor.

I claim :—

1. An electrically energized spring motor including a frame, a drive shaft mounted for rotation therein, a half barrel secured to the shaft, another half barrel rotatably mounted on the shaft, one end of the rotatably mounted half barrel being adapted for driving abutment against one end of the secured half barrel when the rotatably mounted half barrel is rotated in one direction, a secondary spring connecting the half barrels for rotating the secured half barrel when the rotatably mounted half barrel is maintained stationary, means preventing rotation of the rotatable half barrel in the other direction, a sleeve rotatably mounted on the shaft, a main spring, one end of the main spring being connected with the sleeve and the other end being connected with the frame, an armature rotatably mounted in the frame and being connected with the sleeve, a ratchet driving connection between the armature and the rotatably mounted half barrel for rotating the same in driving abutment against the secured half barrel, a movable contact operatively mounted on the armature, a stationary contact mounted on the frame, an electro-magnet, the movable contact being operated by movement of the armature in one direction to make an electrical connection with the stationary contact and by movement of the armature in another direction to break the electrical connection with the stationary contact, the contacts being adapted for being connected in circuit with the winding of the electro-magnet and a battery.

2. An electrically energized spring motor including a rotatable drive shaft, a member secured to the shaft, another member rotatably mounted on the shaft, an end of the rotatably mounted member being adapted for driving abutment against the secured member when the rotatably mounted member is rotated in one direction, a secondary spring connecting the members for rotating the shaft when the rotatably mounted member is maintained stationary, means preventing rotation of the rotatable member in the other direction, a main spring arranged for rotating the rotatable member in the first direction, and means for intermittently energizing the main spring.

3. An electrically energized spring motor including an electro-magnet, an armature, energy storing means arranged for moving the armature in one direction when the storing means is energized, and the electro-magnet being adapted when energized to move the armature in the other direction for energizing the energy storing means, a contact movably mounted on the armature, a stationary contact, the movable contact being adapted when moved to one position on the armature for making a wiping connection with the stationary contact during movement of the armature in one direction, and the movable contact being adapted when moved to another position on the armature for passing without connecting with the stationary contact during a movement of the armature in the other direction, and operative means mounted on the moving armature and actuated by movement of the armature in one direction for moving the movable contact to the one position and by movement of the armature in the other direction for moving the movable contact to the other position.

4. An electrically energized spring motor including an electro-magnet, an armature, and a spring, the spring being arranged for moving the armature in one direction when the spring is energized, and the electro-magnet being adapted when energized to move the armature in the other direction for energizing the spring, a contact movably mounted on the armature, a stationary contact, the movable contact being adapted when moved to one position on the armature for making a wiping connection with the stationary contact during movement of the armature in one direction, and the movable contact being adapted when moved to another position on the armature for passing without connecting with the stationary contact during a movement of the armature in the other direction, and operative means mounted on the moving armature and actuated by movement of the armature in one direction for moving the movable contact to the one position and by movement of the armature in the other direction for moving the movable contact to the other position.

5. In an electrically energized spring motor, a movable armature, a contact movably mounted on the armature, a stationary contact, the movable contact being adapted when moved to one position on the armature for making a wiping connection with the stationary contact during movement of the armature in one direction, and the movable contact being adapted when moved to another position on the armature for passing without connecting with the stationary contact during movement of the armature in the other direction, and operative means mounted on the moving armature and actuated by movement of the armature in one direction for moving the movable contact to the one position and by movement of the armature in the other direction for moving the movable contact to the other position.

6. In an electrically energized spring motor, a movable armature, a contact movably mounted on the armature, a stationary arcuate contact shoe, the movable contact being adapted when moved to one position on the armature for making a wiping connection with the stationary arcuate contact shoe during movement of the armature in one direction, and the movable contact being adapted when moved to another position on the armature for passing without connecting with the stationary arcuate contact shoe during movement of the armature in the other direction, and operative means mounted on the moving armature and actuated by movement of the armature in one direction for moving the movable contact to the one position and by movement of the armature in the other direction for moving the movable contact to the other position.

7. An electrically energized spring motor including a frame, a drive shaft mounted for rotation therein, a half barrel secured to the shaft, another half barrel rotatably mounted on the shaft, one end of the rotatably mounted half barrel being adapted for driving abutment against one end of the secured half barrel when the rotatably mounted half barrel is rotated in one direction, a secondary spring connecting the half barrels for rotating the secured half barrel when the rotatably mounted half barrel is maintained stationary, means preventing rotation of the rotatable half barrel in the other direction, a sleeve rotatably mounted on the shaft, a main spring, one end of the main spring being connected with the sleeve and the other end being connected with the frame, an armature rotatably mounted in the frame and being connected with the sleeve, a ratchet driving connection between the armature and the rotatably mounted half barrel for rotating the same in driving abutment agannst the secured half barrel, a movable contact operatively mounted on the armature, a stationary arcuate contact shoe mounted on the frame, an electro-magnet, the movable contact being operated by movement of the armature in one direction to make an electrical connection with the stationary arcuate contact shoe and by movement of the armature in another direction to break the electrical connection with the stationary arcuate contact shoe, the contacts being adapted for being connected in circuit with the winding of the electro-magnet and a battery.

8. An electrically energized spring motor including a frame, a drive shaft mounted for rotation therein, an arm member secured to the shaft, another arm member rotatably mounted on the shaft, a portion of the rotatably mounted arm member being adapted for driving abutment against a portion of the secured arm member when the rotatably mounted arm member is rotated in one direction, a secondary spring connecting the arm members for rotating the secured arm member when the rotatably mounted arm member is maintained stationary, means preventing rotation of the rotatable arm member in the other direction, a sleeve rotatably mounted on the shaft, a main spring, one end of the main spring being connected with the sleeve and the other end being connected with the frame, an armature rotatably mounted in the frame and being connected with the sleeve, a ratchet driving connection between the armature and the rotatably mounted arm member for rotating the same in driving abutment against the secured arm member, a movable contact operatively mounted on the armature, a stationary contact mounted on the frame, an electro-magnet, the movable contact being operated by movement of the armature in one direction to make an electrical connection with the stationary contact and by movement of the armature in another direction to break the electrical connection with the stationary contact, and the contacts being adapted for being connected in circuit with the winding of the electro-magnet and a battery.

9. An electrically energized spring motor including a frame, a drive shaft mounted for rotation therein, an arm member secured to the shaft, another arm member rotatably mounted on the shaft, a portion of the rotatably mounted arm member being adapted for driving abutment against a portion of the secured arm member when the rotatably mounted arm member is rotated in one direction, a secondary spring connecting the arm members for rotating the secured arm member when the rotatably mounted arm member is maintained stationary, means preventing rotation of the rotatable arm member in the other direction, a sleeve rotatably mounted on the shaft, a main spring, one end of the main spring being connected with the sleeve and the other end being connected with the frame, an armature rotatably mounted in the frame and being connected with the sleeve, a ratchet driving connection between the armature and the rotatably mounted arm member for rotating the same in driving abutment against the secured arm member, a movable contact operatively mounted on the armature, a stationary arcuate contact shoe mounted on the frame, an electro-magnet, the movable contact being operated by movement of the armature in one direction to make an electrical connection with the stationary arcuate contact shoe and by movement of the armature in another direction to break the electrical connection with the stationary arcuate contact shoe, and the contacts being adapted for being connected in circuit with the winding of the electro-magnet and a battery.

In testimony that I claim the above, I have hereunto subscribed my name.

JOSEPH SCHIBLER.